M. C. BROWN.
COOKING UTENSIL.
APPLICATION FILED SEPT. 8, 1915.
1,193,353.
Patented Aug. 1, 1916.
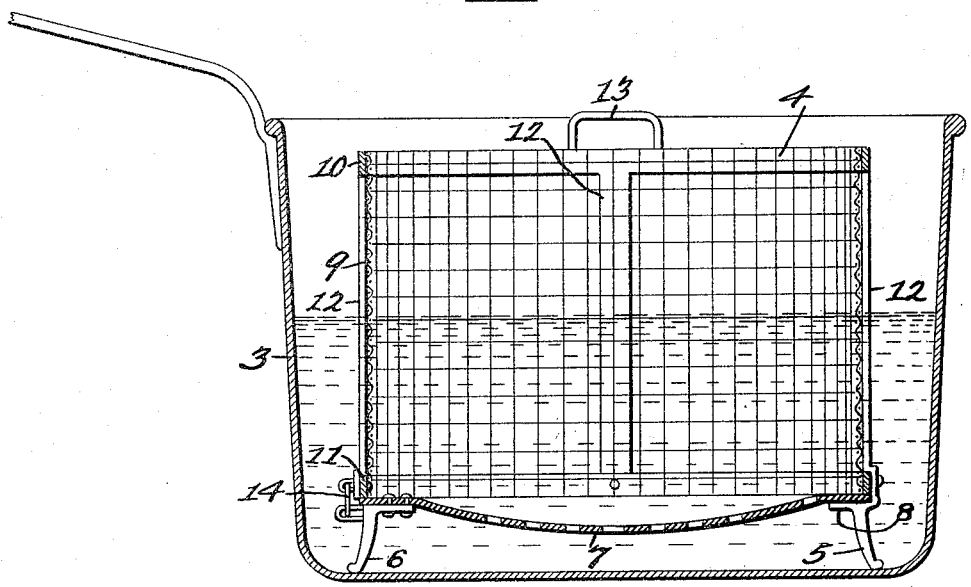
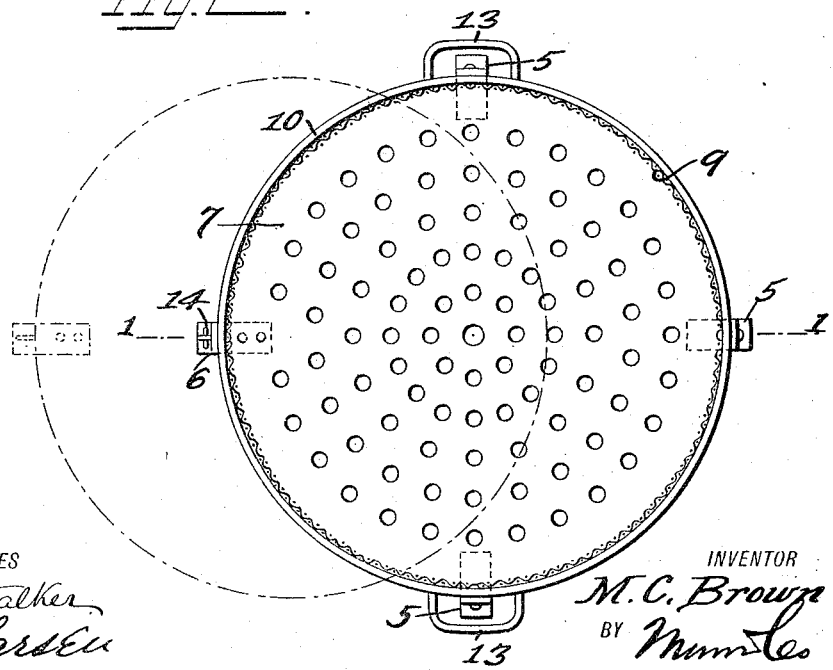
WITNESSES
H. J. Walker
J. E. Larsen
INVENTOR
M. C. Brown
BY Munn & Co.
ATTORNEYS

UNITED STATES PATENT OFFICE.

MARY CORNELIA BROWN, OF FARGO, NORTH DAKOTA.

COOKING UTENSIL.

1,193,353.  Specification of Letters Patent.  Patented Aug. 1, 1916.

Application filed September 8, 1915.  Serial No. 49,498.

*To all whom it may concern:*

Be it known that I, MARY CORNELIA BROWN, a citizen of the United States, and a resident of Fargo, in the county of Cass and State of North Dakota, have invented certain new and useful Improvements in Cooking Utensils, of which the following is a specification.

My invention relates to what is known as the double boiler type of utensils, and one of the main objects thereof is to provide the inner member of such form as to be readily removed from the outer member without danger of scalding the hands, wherein the material being cooked cannot be burned, and from which the cooked material may be removed to a suitable receptacle, such as a plate or platter, without the necessity for inverting the said inner member, and also wherefrom the water may be drained without disturbing the material contained in the utensil.

My invention is fully described in the following specification, of which the accompanying drawings form a part, in which like characters refer to like parts in each of the views, and in which:—

Figure 1 is a central vertical section taken through my invention in position for use within a boiler or pot, on the line 1—1 of Fig. 2; and Fig. 2 is a top plan view of the inner member constituting my invention, removed from the outer member.

In Fig. 1 of the drawings I have shown a pot or boiler of the usual or any desired type at 3 within which food is adapted to be cooked but, because of its being of a single bottom, food is frequently burned, and I therefore provide an inner member or container 4 for the food, and which is raised above the bottom of the boiler by a plurality of legs, three of which, 5, are secured directly to the container, and the other of which, 6 is secured to the perforated bottom 7. The legs 5 have an inwardly directed portion 8, each, which collectively serve as the support for the bottom 7 and upon which said bottom may be slid, the leg 6 serving as a handle for the bottom in moving it to or from the under side of the container.

The wall of the container is shown as of wire mesh 9 supported by hoops 10 and 11 held in relative positions by means of vertical bars 12, suitable handles 13 being provided at the top hoop 10, whereby the container may be readily introduced into or removed from the boiler 3, and I may also provide a catch 14 of any desired form to prevent accidental displacement of the removable bottom 7.

In practice, when the food is cooked, the container is removed from the boiler and the water permitted to drain therefrom, after which a platter or other receptacle may be placed beneath the container and the bottom 7 drawn outwardly, as indicated by dotted lines in Fig. 2, to deposit the food in the container upon said receptacle, ready for service.

It will thus be seen that the food cannot be burned during cooking, and that there is no likelihood of scalding the hands in the removal of the food from the boiler to the table, and the container may also be used for draining or for straining purposes in operations not involving the boiler.

My invention is very simple though highly efficient, is always ready for use and easily cleansed after use, may be made of different materials and in different shapes and sizes, and is comparatively inexpensive, as well as being adapted for use with conventional pots and boilers, stew-pans, and the like.

Having fully described my invention, what I claim as new, and desire to secure by Letters Patent, is:—

As an article of manufacture, a foraminous vessel, handles at the top thereof, a plurality of supporting legs therefor provided, each, with an inwardly directed lug, a perforate bottom plate slidable on said lugs, a supplemental leg beneath one edge of said bottom plate, and a catch between said bottom plate and said vessel.

In testimony whereof I have signed my name to this specification in the presence of two subscribing witnesses.

MARY CORNELIA BROWN.

Witnesses:
J. A. ANDERSON,
A. B. TAYLOR.

Copies of this patent may be obtained for five cents each, by addressing the "Commissioner of Patents, Washington, D. C."